No. 705,478. Patented July 22, 1902.
M. STOBBS & J. S. THOMPSON.
COMBINED ROAD CLEANER, ELEVATOR, AND DIRT CART.
(Application filed Dec. 26, 1899.)
(No Model.) 2 Sheets—Sheet 1.
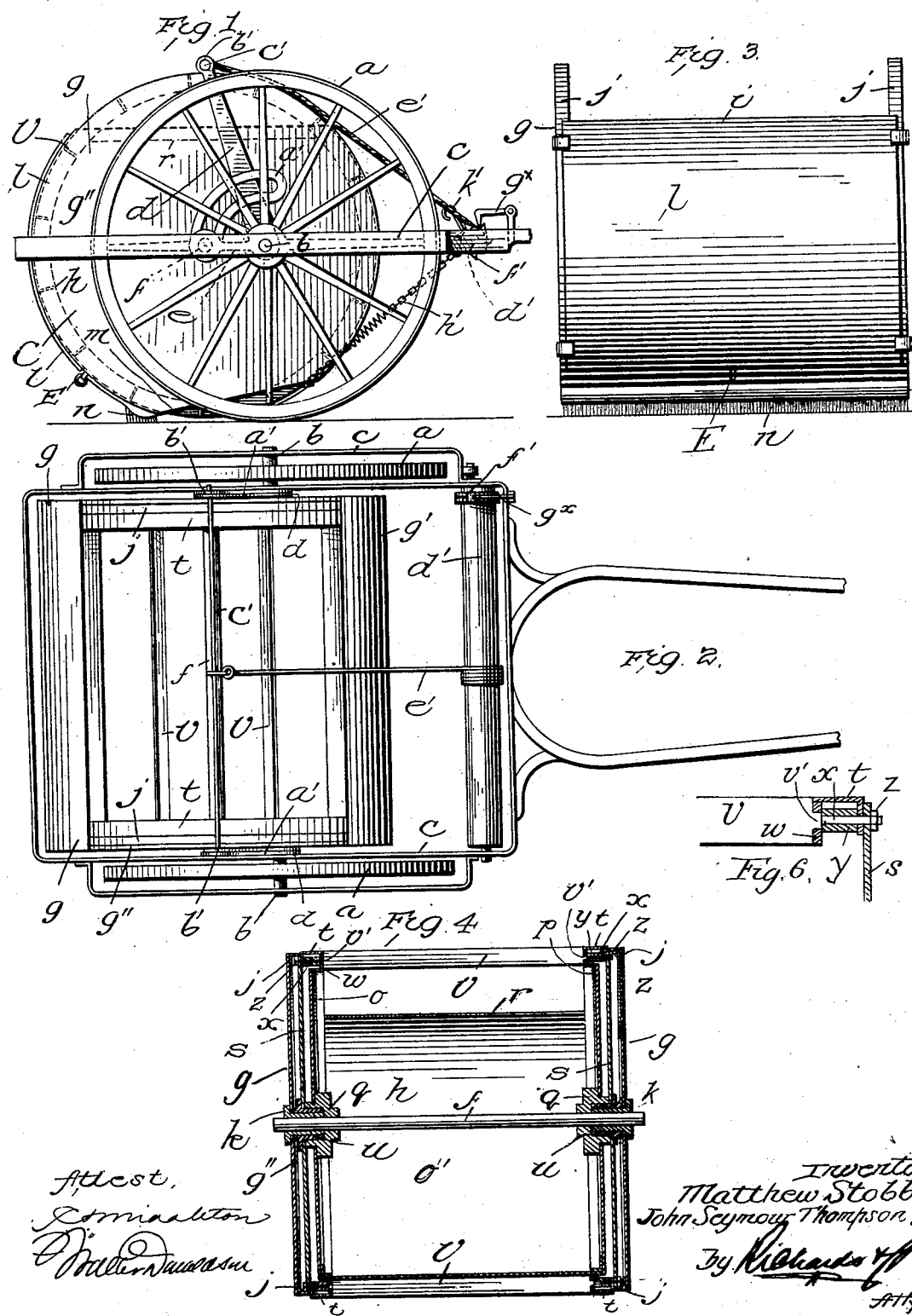

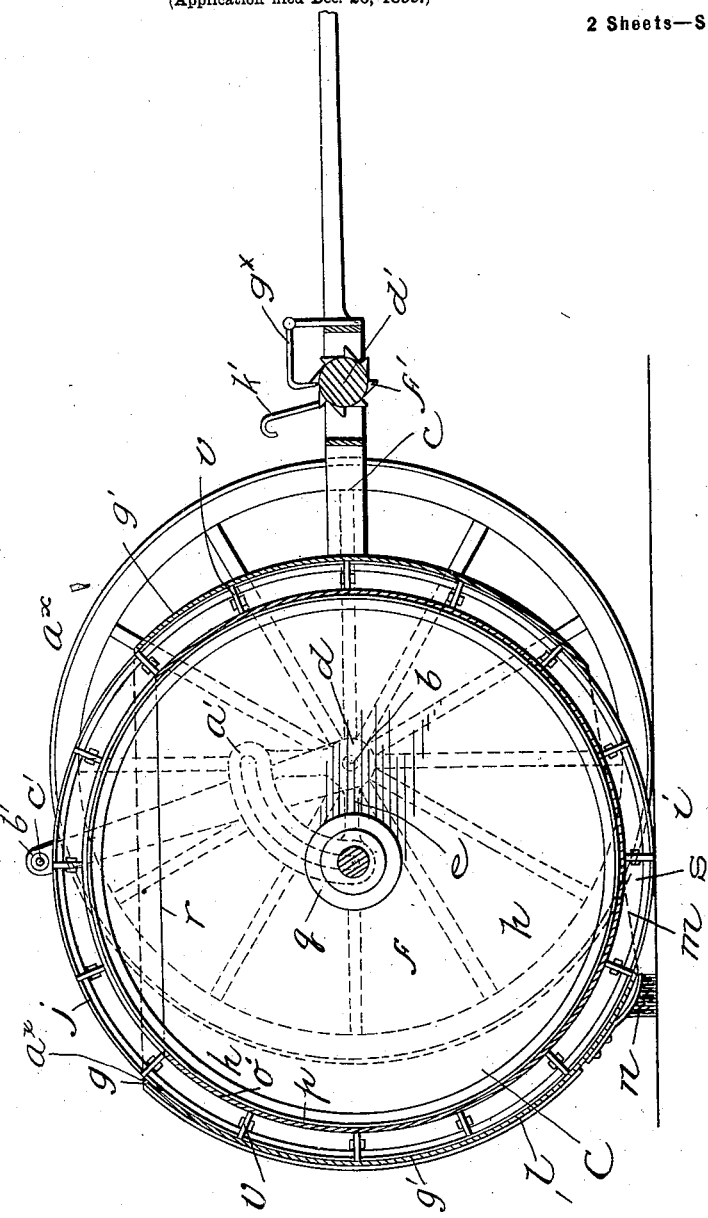

UNITED STATES PATENT OFFICE.

MATTHEW STOBBS AND JOHN S. THOMPSON, OF SYDNEY, NEW SOUTH WALES, AUSTRALIA.

COMBINED ROAD-CLEANER, ELEVATOR, AND DIRT-CART.

SPECIFICATION forming part of Letters Patent No. 705,478, dated July 22, 1902.

Application filed December 26, 1899. Serial No. 741,591. (No model.)

*To all whom it may concern:*

Be it known that we, MATTHEW STOBBS and JOHN SEYMOUR THOMPSON, subjects of the Queen of Great Britain, residing at Sydney, New South Wales, have invented new and useful Improvements in a Combined Road-Cleaner, Elevator, and Dirt-Cart, of which the following is a specification.

The invention consists in the features and combination of parts hereinafter described, and particularly pointed out in the claims.

In the drawings, Figure 1 is a side view of the invention; Fig. 2, a plan view; Fig. 3, a detail rear view of the casing and brush; Fig. 4, a sectional view along the axis of the casing. Fig. 5 is a sectional view from front to rear of the apparatus. Fig. 6 is a detail view.

In the drawings, $a$ represents the cart-wheels, rotating on suitable axles $b$, which support a frame $c$. On these axles angle-levers $d$ are fixed. The horizontal arms $e$ of these levers support a shaft $f$. The ends of this shaft project into guideways $a'$ of segmental form secured to the frame $c$. The shaft $f$ supports a casing $g$ of substantially cylindrical form, the hubs $k$ of said outer casing $g$ being fixed to the shaft. This casing is open at top and bottom, as indicated at $a^\times$ and $m$, respectively, these letters denoting the points at which the cylindrical shell $g'$ of the casing is interrupted to leave the upper and lower openings. The casing $g$ is made up of the said cylindrical shell $g'$ and the heads or side plates $g''$, which are secured to the angle-iron rings $j$. This casing is adapted to turn axially; but it is normally prevented from turning by means of a chain $h'$, connecting the same with the frame. Within the said casing $g$ a receiver $h$ is arranged. This is made up of side plates $o$, a cylindrical shell $o'$, angle-iron rings $p$, to which shell and heads are connected, and hubs or bushes $q$, which are fixed to the side plates $o$ and are keyed to the axle $f$. The cylindrical shell is cut away or interrupted at $r$ at the top of the receiver to leave an opening at this point. Between the receiver $h$ and the outer casing $g$ a conveyer operates. This consists of side plates or heads $s$, carried by a bush or hub $u$, adapted to rotate about the hubs $k$ of the relatively fixed outer casing $g$. The plates $s$ are connected with the angle-iron rings $t$, which are located at the periphery of the plates and serve to strengthen the same. Conveyer-blades V are attached to the plates $s$, said blades having shouldered portions or projections V', fitting in openings in rings W, and from these shoulders the bolts $x$ project, forming extensions of the said shoulders, said bolts connecting, by means of nuts $z$, with the plates $s$, and thus securing the blades to the plates $s$. Distance-ferrules Y are preferably arranged between the rings $w$ and the angle-iron rings $t$. It will be seen that the receiver $h$ is of substantially cylindrical form. It is of smaller diameter than the casing $g$, and being concentric thereto an annular or substantially annular space is left between the casing and the receiver in which the series of blades V move. These blades are arranged radially in respect to the axle $f$. The whole series of blades with the plates $s$, carrying the same, are to rotate, and for this purpose they project through the lower opening at $m$, so that the plates contact with the ground, and thus turn as the apparatus is drawn forward. At the rear lower part of the outer casing a brush $n$ is fixed. This lies immediately at the rear of the opening at $m$, and as the apparatus is drawn forward the dirt collected by the brush will be gathered up by the blades V and carried up between the cylindrical shells $g'$ and $o'$, and upon arriving at the opening $r$ of the inner receiver the dirt will be discharged into the same and will be held thereby, as the bottom of this receiver is closed. The outer casing is kept closed at its upper part by a sliding door $l$ of segmental form, which is adapted to be slid over the said opening while the machine is in operation collecting the dirt.

The long arms $b'$ of the angle-levers $d$ are connected at their upper ends by a cross-rod $c'$, which is connected by a cord $e'$ with a drum $d'$, journaled in the frame $a$ and provided with a ratchet $f'$ at one end. The ratchet is arranged to be engaged by a pawl $g^\times$ to hold the drum against turning backwardly.

A hook $k'$ is pivoted to the frame to engage the cross-bar $c'$ when the same is brought thereto when it is desired to lift the receiver and outer casing from the ground. When this is to be done, the drum $d'$ is turned by a suitable crank and the outer casing is raised. In this raised position the parts may be held by causing the hook or pawl $k'$ to engage the cross-rod $c'$. The apparatus may now be drawn freely in order to carry the load obtained to the dumping-place. When the apparatus is to be dumped, the rope $e'$ is unfastened from the cross-rod $c'$, and this end is carried beneath the outer casing $g$ and attached onto some point, as E. Upon turning the roller (the outer casing and receiver remaining elevated) the said outer casing and receiver will be rotated about their common axis, so that the openings at $r$ and $a^\times$ of the said receiver and outer casing will be lowermost, and thus the contents of the receiver will be discharged.

We claim as our invention—

1. In a combined road-cleaner, elevator and dirt-cart, an outer stationary casing supported in proximity to the ground and having an open lower portion, an inner stationary receiver arranged concentric therewith forming an annular space between, said receiver having an open upper side, radially-arranged blades located in said annular space, and means for causing said blades to travel through said space, substantially as described.

2. In combination, an outer stationary casing having an open lower side supported in proximity to the ground, an inner stationary receiver arranged concentric therewith with an annular space between, and spaces at the ends, said receiver having an open upper portion, heads or plates journaled in the spaces between the ends of said casing and receiver, and radially-arranged blades carried by said heads and fitting said annular space, substantially as described.

3. In combination, an outer stationary casing having an open lower side supported in proximity to the ground, an inner stationary receiver arranged concentric therewith with an annular space between, and spaces at the ends, said receiver having an open upper portion, heads or plates journaled in the spaces between the ends of said casing and receiver, and radially-arranged blades carried by said heads and fitting said annular space and means for raising said casings from the ground, substantially as described.

4. In combination, a frame, supporting-wheels journaled therein, angle-levers pivotally mounted in said frame, an axle carried by said angle-levers, a stationary cylindrical casing carried by said axle having an open lower side, a cylindrical receptacle within the casing also carried by said axle having an open upper side, heads or plates journaled on the axle between the ends of the casing and receptacle and projecting through the open side of the casing for contact with the ground, radial blades carried by said heads and fitting the annular space between the peripheral walls of the casing and receptacle, and means for rocking said angle-levers, substantially as described.

In witness whereof we have hereunto set our hands in presence of two witnesses.

MATTHEW STOBBS.
JOHN S. THOMPSON.

Witnesses:
W. WALKER,
D. AULD.